| United States Patent [19] | [11] Patent Number: 4,886,909 |
| Lin et al. | [45] Date of Patent: Dec. 12, 1989 |

[54] AROMATIC AMINE TERMINATED TRIFUNCTIONAL POLYOXYALKYLENE UREA

[75] Inventors: Jiang-Jen Lin, Round Rock; George P. Speranza, Austin, both of Tex.

[73] Assignee: Texaco Chemical Company, White Plains, N.Y.

[21] Appl. No.: 222,696

[22] Filed: Jul. 22, 1988

[51] Int. Cl.[4] ........................................... C07C 127/19
[52] U.S. Cl. .................................................... 564/50
[58] Field of Search ........................................ 564/50

[56] References Cited

U.S. PATENT DOCUMENTS 4,705,814 11/1987 Grigsby, Jr. et al. ................ 528/60

Primary Examiner—Douglas W. Robinson
Assistant Examiner—Joseph A. Lipovsky
Attorney, Agent, or Firm—Jack H. Park; Kenneth R. Priem; Cynthia L. Kendrick

[57] ABSTRACT

A novel aromatic amine terminated trifunctional polyoxyalkylene urea which is useful as an epoxy curing agent is disclosed and is prepared in a two step process comprising reacting a triamine or a triol with a diisocyanate to form an intermediate product and subsequently reacting the intermediate with a diprimary amine in the presence of an alcohol solvent.

20 Claims, No Drawings

AROMATIC AMINE TERMINATED TRIFUNCTIONAL POLYOXYALKYLENE UREA

FIELD OF THE INVENTION

This invention relates to derivatives of polyoxyalkylene triamines. More particularly, this invention relates to novel compositions of matter comprising aromatic amine terminated trifunctional polyoxyalkylene ureas, prepared in two steps by reacting a triamine with a diisocyanate to form an intermediate containing a urea-linkage which is then reacted with an aromatic diamine, such as diethyltoluene diamine to form the novel composition. In the case of certain low molecular weight triamines where problems with gelation are encountered, a second embodiment affords a two step process for reacting a trifunctional polyether triol with a diisocyanate in the presence of a tin catalyst to form a prepolymer containing a urethane-linkage which is then reacted with a diamine.

BACKGROUND OF THE INVENTION

A number of curing agents for epoxy resins are known in the art, as well as a variety of methods for preparing epoxy curing compositions. Related, copending U.S. patent application Ser. No. 07/078,308 contains an extensive survey of art in this area. The invention described in that application concerns novel polyamidopolyamines. The products are prepared by the sequential reaction of an aliphatic or aromatic di-primary amine with a reaction product of at least a molar excess of an aromatic or aliphatic dicarboxylic acid with a polyoxyethylene, a polyoxypropylene or a poly(oxyethylene/oxypropylene)diamine or triamine. The reaction takes place at a temperature of about 150°–250° C.

The references found fail to disclose any urea-linked trifunctional aromatic amine terminated compositions. Urea linkages are desirable because they are more stable and, in general, add more toughness to a polymer.

The present invention, using low temperatures produces a triamine derivative composition which is terminated with aromatic amines and contains urea linkages. Further, formation of the product does not require a catalyst when high molecular weight triamines are the reactants. It was observed that in the case of low molecular weight triamines there were problems with gelation. However, in an alternate embodiment trifunctional polyether triols were used instead of triamines and reacted at fairly mild temperatures in the presence of a tin catalyst to form trifunctional aromatic amines in two steps while avoiding problems with gelation.

These compositions are useful for applications such as epoxy coatings. The products are especially adapted for use in Reaction Injection Molding because their reactivity with isocyanates is very suitable. Other uses may be apparent to those skilled in the art.

SUMMARY OF THE INVENTION

In accordance with the foregoing, the present invention provides a method of preparing an isocyanate terminated, urea-linked intermediate and the compositions formed therefrom by reacting the intermediate with a diamine.

More specifically there is provided a two-step method for the preparation of an aromatic amine terminated trifunctional polyoxyalkylene urea which comprises reacting a polyoxyalkylenetriamine and a diisocyanate to form an intermediate which is reacted with a diamine in the presence of an alcohol solvent at ambient temperature or lower and atmospheric pressure to form a novel aromatic amine terminated composition.

In the second embodiment there is provided a two step synthetic route for the preparation of trifunctional aromatic amines which comprises reacting a trifunctional polyether triol or {lower M.W. triamine} and a diisocyanate in the presence of a tin catalyst to form a prepolymer which is reacted with a diamine in the presence of an alcohol solvent at mild temperatures and atmospheric pressure.

DETAILED DESCRIPTION

According to the present invention trifunctional prepolymers with an isocyanate termination can be reacted with a diamine to form a product terminated with aromatic amines and useful as an epoxy curing agent. The product can be derived without a catalyst under very mild conditions. With the triols or low molecular weight triamines a tin catalyst and slightly higher temperatures help provide the desired results.

The aromatic amine terminated trifunctional polyoxyalkylene ureas of the present invention are reaction products which may generally be characterized as compositions represented by the following formula:

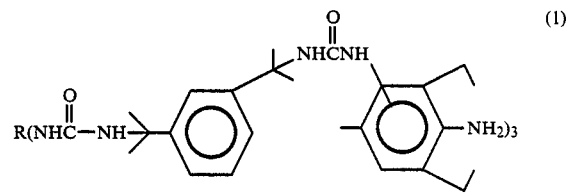

wherein R represents an ethoxy, a propoxy or an ethoxy/propoxy group having an average molecular weight of about 200 to about 7000. The product of the second embodiment is similar and can be represented as follows:

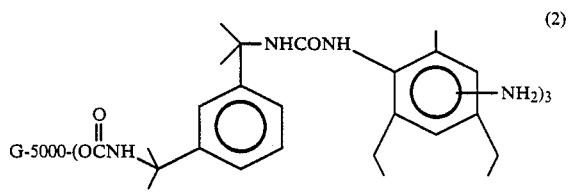

The novel compositions are essentially the reaction product of:

(1) a triamine of the formula

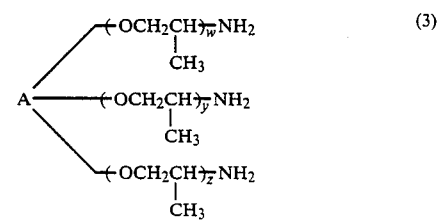

wherein A represents the nucleus of an oxyalkylation susceptible trihydric alcohol containing about 3 to 6 carbon atoms and w, y and z are numbers and the average value of the sum of w, y and z is from about 10 to about 100; and in the second embodiment wherein a triol is used, it can be represented as follows:

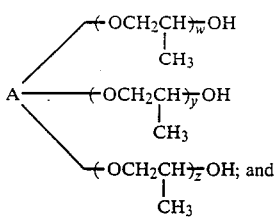

(2) an alkyl diisocyanate; and
(3) a diprimary amine of the formula $$H_2N-R''-NH_2$$

wherein R'' represents an aromatic group having an average molecular weight of about 72 to about 500 and containing from about 6 to about 35 carbon atoms, wherein said triamine and diisocyanate are reacted in a first step to form an intermediate which is subsequently reacted with said diamine in the presence of an alcohol solvent at a temperature of from about 0° C. to 100° C.

In the process of this invention a series of novel compositions of products containing T-5000 or T-3000 urea-linked aromatic amines have been prepared by the following exemplified reaction:

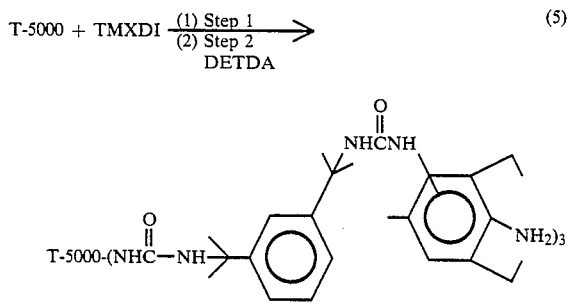

In the second embodiment a simple synthetic route to prepare trifunctional aromatic amines from the coupling reaction or prepolymer (I) and DETDA has been disclosed as follows:

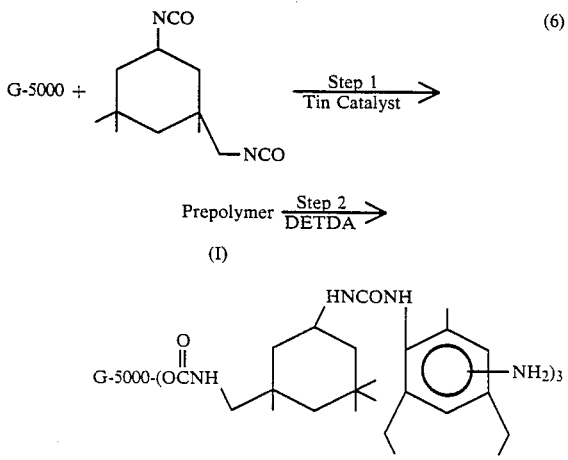

THE TRIAMINE STARTING MATERIAL

As stated above, the triamine useful herein can be represented by structure (3) above.

Examples of appropriate polyoxypropylene triamines that may be used as starting materials for the present invention include triamines sold by Texaco Chemical Co. as JEFFAMINE ® T-series products having the formula referred to above. An example of such a product having an average molecular weight of about 3000 wherein A represents a triol nucleus is JEFFAMINE ® T-3000 amine and a product having an average molecular weight of about 5000 wherein A represents a glycerol nucleus and the product contains about 85 moles of propylene oxide is JEFFAMINE ® T-5000 amine.

THE TRIFUNCTIONAL POLYETHER POLYOL STARTING MATERIAL

As stated above, the polyether polyol useful herein can be represented by structure (4) above.

Examples of appropriate polyols that may be used as starting materials for the present invention include trifunctional polyether triols sold by Texaco Chemical Co. as THANOL ® polyols having the formula referred to above. An example of such a product having an average molecular weight of about 5000 is THANOL ® G-5000, Texaco product number GA84060383. THANOL ® G-5000 is a trifunctional polyether triol which is a precursor to JEFFAMINE ® T-5000. The JEFFAMINE ® T-series products have the formula:

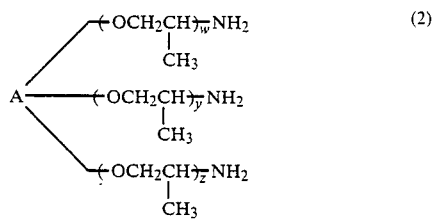

wherein A represents the nucleus of an oxyalkylation susceptible trihydric alcohol containing about 3 to 6 carbon atoms and w, y and z are numbers and the average value of the sum of w, y and z is from about 10 to about 100; and in the G-series precursors each of the amine groups is replaced by a hydroxy group. Another polyether triol having an average molecular weight of about 400 wherein propylene oxide is added to trimethylolpropane is a Texaco product which is a precursor to JEFFAMINE ® T-403.

THE ISOCYANATE REACTANT

The isocyanate component for the present invention may be any suitable isocyanate having the desired functionality. Alkyldiisocyanates work well. The organic diisocyanate can be an aliphatic or an aromatic or a mixture thereof. Although diisocyanates are preferred, other higher polyisocyanates can be used in combination with diisocyanates and/or monoisocyanates.

Diisocyanates which work in the invention for producing triamines containing urea linkages include isophorone diisocyanate (IPDI), p-tetramethylxylene diisocyanate (TMXDI), m-tetramethylxylene diisocyanate, hexamethylene diisocyanate (HMDI), toluene diisocyanate, diphenylmethane diisocyanate and the like. The suitability of these diisocyanates is demonstrated in the examples and they can be represented by the following formulas:

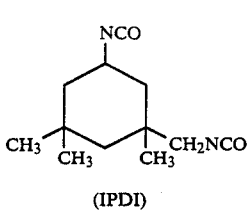
(IPDI)

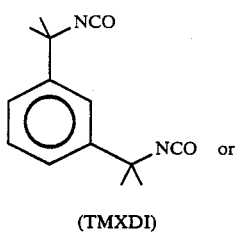
(TMXDI)

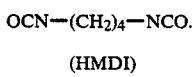
(HMDI)

SOLVENT

A solvent is desirable for carrying out the invention. A solvent is useful in both steps of the invention and is essential for the second step in order to avoid gel formation. The solvent is preferably an alcohol.

Suitable solvents are those which are relatively unreactive toward isocyanate groups. Generally suitable solvents are polar or those having a high dielectric constant. Examples of suitable polar solvents include methanol, ethanol, isopropanol and tert-butanol. Good results were obtained using isopropanol and t-butanol.

THE DIAMINE REACTANT

In accordance with the present invention, the intermediate reaction product is reacted with a diamine in the second step of the invention. The diamine is suitably an aromatic di-primary amine.

Such di-primary amines can be represented by the formula:

$$H_2N-R''-NH_2$$

wherein R" represents an aromatic group having an average molecular weight of about 72 to about 500 and containing from about 6 to about 35 carbon atoms.

R" may suitably be a phenyl, a alkyl substituted phenyl, a cycloalkyl substituted phenyl group, etc.

Representative di-primary amines that may be used include diamino benzenes, toluene diamines, diethylphenyl diamines and diethyltoluene diamine.

The examples demonstrate the usefulness of diethyltoluene diamine in the present invention.

CATALYST

Where a trifunctional polyether polyol or lower molecular weight triamine is reacted with a diisocyanate the presence of a catalyst facilitates the reaction. A suitable catalyst should contain a Group IVA metal. The Group IVA metal which is preferred is tin. A variety of tin-containing metals will work in the reaction, including, but not limited to dialkyl dicarboxylates and stannous carboxylates. Preferred tin-containing compounds are dialkyltin carboxylates such as dibutyltin dilaurate $[(C_4H_9)S_n(OCOC_{10}H_{20}CH_3)_2]$. The effectiveness of dibutyltin dilaurate is demonstrated in Examples 10–14.

METHOD

In accordance with the invention demonstrated in Examples 1 to 9, the triamine is added dropwise to a reaction mixture containing diisocyanate and optionally an alcohol in the first step.

The adduct of the above mixture is then transferred into a dropping funnel and added into a solution containing a di-primary amine and alcohol. The second reaction is exothermic and may require cooling.

The temperatures used in the first step are mild and preferably from 0° C. to about 50° C. Atmospheric pressure is suitable.

Where a triol is used the mixture in the first step should be heated to a pot temperature of about 50° C. to about 120° C. The very low temperatures are not sufficient in this embodiment. However, in the second step where the prepolymer is reacted with a diamine, a mild temperature in the range of 0°–50° C. is sufficient.

The product can be characterized by end-group analysis using nmr, IR and titration methods. The products may be liquid, semisolid or solid.

The aromatic amine terminated trifunctional polyoxyalkylene ureas of the instant invention demonstrate the desirable flexibility of polymers over comparable epoxy curing compositions in the art.

The present invention will be further illustrated by the following examples which are only for the purpose of illustration and are not to be regarded as limiting the invention in any way.

EXAMPLE 1

A 1-liter 3-necked flask equipped with thermometer, mechanical stirrer, dropping funnel and $N_2$-inlet line, was charged with tetramethyl xylene diisocyanate (TMXDI, 29.3 g, 0.12M) and i-PrOH (60 g). At pot a temperature of 5–20° C., a mixture of JEFFAMINE ® T-5000 amine (231 g, 0.04M) and isopropanol (300 g) was added dropwise over a 2 hour period of time. The mixture of T-5000-TMXDI adduct was transferred into a dropping funnel and added into the solution of DETDA (diethyltoluenediamine 42.7 g, 0.24M) in i-PrOH (50 g). The reaction was exothermic and subsided by an ice/water bath. The addition was carried out within 25 minutes. The isopropanol solvent was then removed by distillation and subjected finally to a reduced pressure line at 180° C. pot temperature. The resulting product was brown, transparent semisolid, having amine analysis of 1.20 meq (calc. 1.19 meq/g).

EXAMPLE 2

Example 2 demonstrates the use of the product of Example 1 as a curing agent.

A mixture of the sample from Example 1 (21.0 g) and EPON ® 828 (Shell product, 9.5 g) was mixed well at a warm temperature and poured into a mold and cured at 88° C. overnight. EPON ® 828 is a diglycidyl ether of Bisphenol A from Shell. A brown, transparent, flexible and good integrity material was made.

The data in Table I further illustrates properties resulting from the use of various triamines and diisocyanates.

TABLE 1

AROMATIC AMINE TERMINATED TRIFUNCTIONAL POLYOXYALKYLENE UREA

| Example | Molar Ratio of Starting Materials | Product Properties Amine Anal. meq/g; calc meq/g |
|---|---|---|
| 3 | T-3000-IPDI-DETDA (1:3:3) | Liquid[a] (light brown) |
| 4 | T-3000-IPDI-DETDA[b] (1:3:3) | Semisolid (brown) 0.87 (0.71) |

TABLE 1-continued

AROMATIC AMINE TERMINATED
TRIFUNCTIONAL POLYOXYALKYLENE UREA

| Example | Molar Ratio of Starting Materials | Product Properties Amine Anal. meq/g; calc meq/g |
|---|---|---|
| 5 | T-3000-TMXDI-DETDA (1:3:6) | Semisolid (brown) 1.87 (2.45) |
| 6 | T-5000-TMXDI-DETDA (1:3:6) | Solid (brown) 1.22 (1.32) |
| 7 | T-5000-IPDI-DETDA (1:3:6) | Solid (brown, rubbery) 1.22 (1.34) |
| 8 | T-5000-TMXDI-DETDA (1:3:3) | Solid (brown, rubbery) 1.20 (1.19) |
| 9 | T-403-IPDI-DETDA | Gelation |

Note:
IPDI: Isophorone diisocyanate
TMXDI: Tetramethyl xylene diisocyanate
<sup>a</sup>Contains i-PrOH solvent
<sup>b</sup>Methyl ethyl ketoxime added It is noted that JEFFAMINE ® T-403 is not as well suited for use in this invention because of gelation problems. The invention is generally more suited to higher molecular weight triamines.

Examples 10–14 demonstrate the embodiment where a low molecular weight triamine or a triol is used as the reactant.

EXAMPLE 10

G 5000-IPDI-DETDA (1:3:6)

To a 1-liter 3-necked flask equipped with thermometer, mechanical stirrer, dropping funnel and N$_2$-inlet line, was charged G-5000 (208 g, 0.04M), IPDI (26.6 g, 0.12M) and T-13 (dibutyl tin dilaurate, 0.6 g). The mixture was heated to 80° C. over a 2 hour period and cooled to ambient temperature. The viscous colorless liquid was diluted with i-PrOH (300 ml). The isocyanate-terminated product was mixed with DETDA (42.7 g, 0.24M) at 15° C. A slightly exothermic temperature rise to 18° C. was recorded. The solvent, i-PrOH, was then removed by stripping up to 140° C. under reduced pressure. The final product was a highly viscous, brown, flowable, liquid with analysis of 1.22 meq/g amine content (calculated 1.29 meq/g).

EXAMPLE 11

Comparative example, with no i-PrOH solvent

To a 500-ml 3-necked flask equipped with thermometer, stirrer, dropping funnel and N$_2$-inlet line, was charged G-5000 (208 g, 0.04M), IPDI (26.6 g, 0.12M) and T-13 (0.6 g). The mixture was heated to ca. 80° C. for over 2 hours. The solution was cooled to room temperature and was added to DETDA (42.7 g) with stirring. An exothermic reaction was observed and the product turned into very viscous semisolid. This indicated the presence of a suitable solvent was needed.

EXAMPLE 12

G-5000-TMXDI-DETDA (1:3:6)

To a 1-liter 3-necked flask equipped with thermometer, stirrer, addition funnel and N$_2$-pad, was charged G-5000 (208 g, 0.04M), TMXDI (29.3 g, 0.12M) and T-13 (15 drops, ca. 0.6 g). The mixture was heated to 64°–90° C. for over 2 hours. At 30° C., i-PrOH (350 ml) was added, then at 10–14° C., DETDA (42.7 g, 0.24M) and i-PrOH (43 g) were added. The final product solution was heated to 140° C. to remove solvent. The final product (brown, solid) contained amine: 1.40 meq/g (calculated 1.29 meq/g).

EXAMPLE 13

T-400-IPDI-DETDA (1:3:6)

To a one-liter 3-necked flask equipped with thermometer, stirrer, additional funnel and N$_2$-line, was charged T-400 (70 g, 0.175M), IPDI (116.6 g, 0.525M) and T-13 (0.2 g). The mixture was heated to ca. 100° C. for over one hour. The solvent i-PrOH (300 ml) and DETDA (187 g) were added at room temperature. After reaction, and i-PrOH was removed at 140° C. under reduced pressure. A black solid product (352 g) was obtained, containing 4.65 meq/g amine (calculated 4.3 meq/g).

EXAMPLE 14

The procedures of Example 10 were repeated. The product contained amine (1.22 meq/g) and was a brown viscous liquid. A portion of the sample (21.0 g) was preheated to 80° C. and mixed well with EPON ® 828 (9.4 g), poured into a mold and cured at 95° C. overnight. A tough, flexible epoxy material was obtained.

What is claimed is:

1. A novel composition useful as an epoxy curing agent and also useful in reaction injection molding comprising an amine terminated trifunctional polyoxyalkylene urea which essentially consists of the product of the 2-step reaction of a:

(1) a compound from the group consisting of a triamine of the formula:

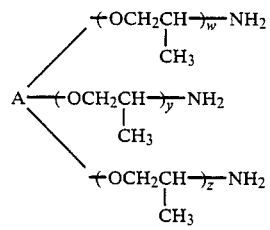

or a trifunctional polyether polyol of the formula:

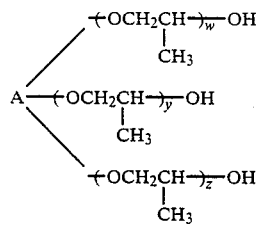

wherein A represents the nucleus of an oxyalkylation susceptible trihydric alcohol containing about 3 to 6 carbon atoms and w, y and z are numbers and the average value of the sum of w, y and z is from about 10 to about 100; and (2) an alkyl diisocyanate from the group consisting of isophorone diisocyanate, hexamethylenediisocyanate, toluenediisooyanate, methylenediphenyldiisocyanate and tetramethylxylene diisocyanate which form an intermediate product; and subsequently reacting the intermediate with (3), a diprimary amine of the formula:

$H_2N-R''-NH_2$ wherein R" represents an aromatic group having an average molecular weight of about 72 to about 500 and containing from about 6 to about 35 carbon atoms, in the presence of an alcohol solvent wherein the temperature for the first step where the triol is reacted is from about 50° C. to about 120° C. and for the second step where the prepolymer is reacted with a diamine the temperature is from about 0° C. to 50° C., and in the case where a trifunctional polyether polyol or lower molecular weight triamine is reacted with a diisocyanate the reaction takes place over a Group IVA metal catalyst, and subsequently combining the product of the two-step reaction with an excess of a substance selected from the group consisting of a diprimary amine or a triamine to form the epoxy curing agent.

2. The composition of claim 1 wherein a triamine reactant is used and has an average molecular weight of about 3000 wherein A represents a triol nucleus.

3. The composition of claim 1 wherein a triamine reactant is used has an average molecular weight of about 5000 wherein A represents a glycerol nucleus.

4. The composition of claim 1 wherein a polyether polyol is used and has an average molecular weight of about 5000 wherein A represents a trimethylolpropane or glycerol nucleus.

5. The composition of claim 1 wherein a triol is used and has an average molecular weight of about 400 wherein A represents a trimethylpropane or glycerol nucleus.

6. The composition of claim 1 wherein the diisocyanate reactant is isophorone diisocyanate (IPDI).

7. The composition of claim 1 wherein the diisocyanate reactant is tetramethylxylene diisocyanate (TMXDI).

8. The composition of claim 1 wherein the diisocyanate reactant is toluene diisocyanate.

9. The composition of claim 1 wherein the diisocyanate reactant is diphenylmethane diisocyanate.

10. The composition of claim 1 wherein a triamine is used and wherein in the second step the alcohol solvent is selected from the group consisting of t-butanol and i-propanol.

11. The composition of claim 1 wherein R" is from the group consisting of phenyl, substituted phenyl, and cycloalkyl.

12. The composition of claim 1 wherein the diprimary amine is diethyltoluene diamine.

13. An aromatic amine terminated trifunctional polyoxyalkylene urea, useful as an epoxy curing agent, represented by the formula:

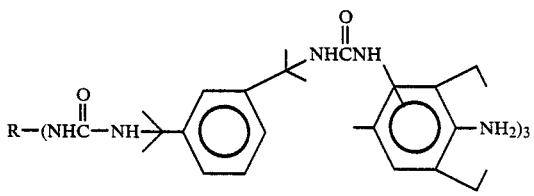

wherein R is the reaction product residue of a triamine of the formula:

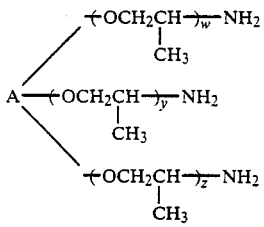

having an average molecular weight of about 5000, containing about 85 moles of propylene oxide, and A represents a glycerol nucleus of an oxyalkylation susceptible trihydric alcohol containing about 3 to 6 carbons and w, y and z are numbers and the average value of the sum of w, y and z is from about 10 to about 100.

14. The composition of claim 13 wherein the triamine has an average molecular weight of about 5000.

15. The composition of claim 13 wherein the triamine has an average molecular weight of about 3000.

16. An aromatic amine terminated trifunctional polyether polyol, useful as an epoxy curing agent, represented by the formula:

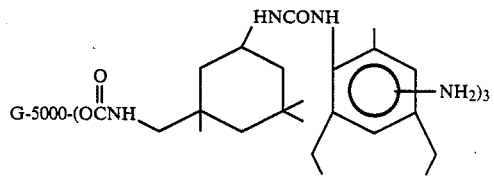

wherein G-5000 is derived from a trifunctional polyether polyol of the formula:

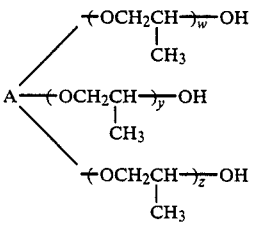

17. The composition of claim 16 wherein the trifunctional polyether has an average molecular weight of about 5000.

18. The composition of claim 16 wherein the trifunctional polyether has an average molecular weight of about 400 and A represents the nucleus of an oxyalkylation susceptible trihydric alcohol containing about 5 to 6 moles of propylene oxide.

19. A two step method for preparing an aromatic amine terminated trifunctional polyoxyalkylene urea which comprises:
Reacting a triamine with an alkyl diisocyanate at a low temperature to form an intermediate and subsequently reacting the intermediate with a diprimary amine in the presence of alcohol solvent.

20. A two step method for preparing trifunctional aromatic amines which comprises:
Reacting a trifunctional polyether polyol with an alkyl diisocyanate in the presence of a tin catalyst at a temperature of about 60° C. to 120° C. to form an intermediate and subsequently reacting the intermediate with a diprimary amine at a temperature of about 0° C. to 50° C.

* * * * *

UNITED STATES PATENT AND TRADEMARK OFFICE
CERTIFICATE OF CORRECTION

PATENT NO.  : 4,886,909
DATED       : December 12, 1989
INVENTOR(S) : Jiang-Jen Lin and George Phillip Speranza It is certified that error appears in the above-identified patent and that said Letters Patent is hereby corrected as shown below:

Claim 1, Col. 8, line 63, delete "toluenediisooynate"

and insert therefor --toluenediisocyanate--.

Signed and Sealed this

Twenty-third Day of October, 1990

Attest:

HARRY F. MANBECK, JR.

Attesting Officer    Commissioner of Patents and Trademarks